(12) United States Patent
Crossley et al.

(10) Patent No.: US 9,899,919 B2
(45) Date of Patent: Feb. 20, 2018

(54) ASYMMETRIC SWITCHING CAPACITOR REGULATOR

(71) Applicant: Lion Semiconductor Inc., San Francisco, CA (US)

(72) Inventors: John Crossley, Oakland, CA (US); Hanh-Phuc Le, Superior, CO (US); Alberto Alessandro Angelo Puggelli, Oakland, CA (US)

(73) Assignee: Lion Semiconductor Inc., San Francisco, CA (US)

( * ) Notice: Subject to any disclaimer, the term of this patent is extended or adjusted under 35 U.S.C. 154(b) by 43 days.

(21) Appl. No.: 15/092,037

(22) Filed: Apr. 6, 2016

(65) Prior Publication Data

US 2016/0308443 A1  Oct. 20, 2016

Related U.S. Application Data

(60) Provisional application No. 62/148,901, filed on Apr. 17, 2015.

(51) Int. Cl.

| | | |
|---|---|---|
| *G05F 1/56* | (2006.01) | |
| *H02M 3/158* | (2006.01) | |
| *H02M 1/14* | (2006.01) | |
| *H02M 3/07* | (2006.01) | |
| *H02M 1/00* | (2006.01) | |

(52) U.S. Cl.
CPC .............. *H02M 3/158* (2013.01); *H02M 1/14* (2013.01); *H02M 3/07* (2013.01); *H02M 2001/007* (2013.01)

(58) Field of Classification Search
CPC ........................................................ G05F 1/56
USPC .......................................... 323/271–289, 351
See application file for complete search history.

(56) References Cited

U.S. PATENT DOCUMENTS

| | | | |
|---|---|---|---|
| 2011/0285369 A1 | 11/2011 | Cuk | |
| 2014/0312860 A1 | 10/2014 | Dally | |
| 2015/0061613 A1* | 3/2015 | Kondou | ................ H02M 3/158 323/271 |
| 2015/0084701 A1 | 3/2015 | Perreault et al. | |
| 2015/0097538 A1 | 4/2015 | Le et al. | |

OTHER PUBLICATIONS

International Search Report and Written Opinion issued by the Korean Intellectual Property Office as searching authority in International Application No. PCT/US2016/026159, dated Jul. 18, 2016 (14 pages).

Kim, et al., "A Fully-Integrated 3-Level DC-DC Converter for Nanosecond-Scale DVFS", IEEE Journal of Solid-State Circuits, 47(1):206-219, Jan. 2012 (14 pages).

(Continued)

*Primary Examiner* — Adolf Berhane
*Assistant Examiner* — Nusrat Quddus
(74) *Attorney, Agent, or Firm* — Byrne Poh LLP

(57) ABSTRACT

The present disclosure provides an asymmetric switching capacitor regulator that is capable of providing an output voltage, covering a wide voltage range, with a high efficiency. The disclosed switching capacitor regulator is configured to generate a wide range of an output voltage by differentiating a voltage across one or more switching capacitors from a voltage across the rest of the switching capacitors in the switching capacitor regulator.

19 Claims, 12 Drawing Sheets

(56) References Cited

OTHER PUBLICATIONS

Kim, et al., "System Level Analysis of Fast, Per-Core DVFS using On-Chip Switching Regulators", IEEE International Symposium on High-Performance Computer Architecture (HPCA), Feb. 2008 (12 pages).

Le, et al., "Design Techniques for Fully Integrated Switched-Capacitor DC-DC Converters", IEEE Journal of Solid-State Circuits, 46(9):2120-2131, Sep. 2011 (12 pages).

\* cited by examiner

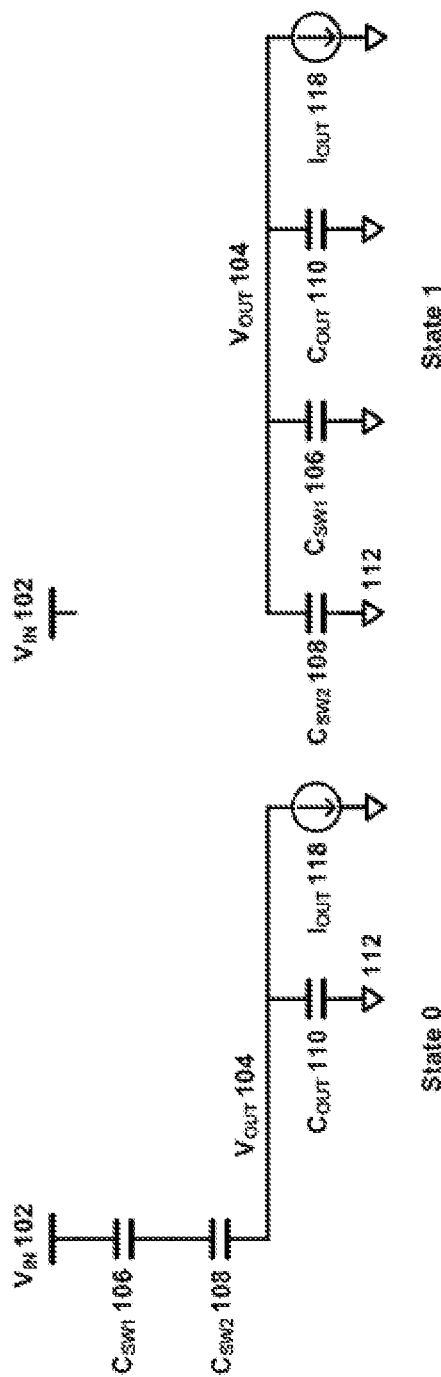
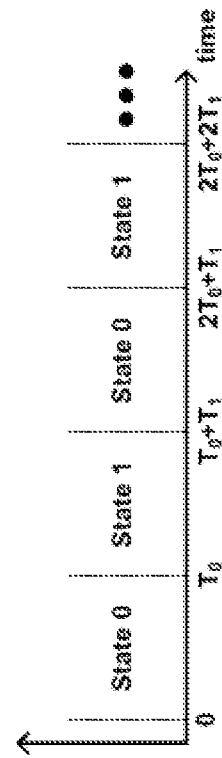
FIG. 1A
FIG. 1B

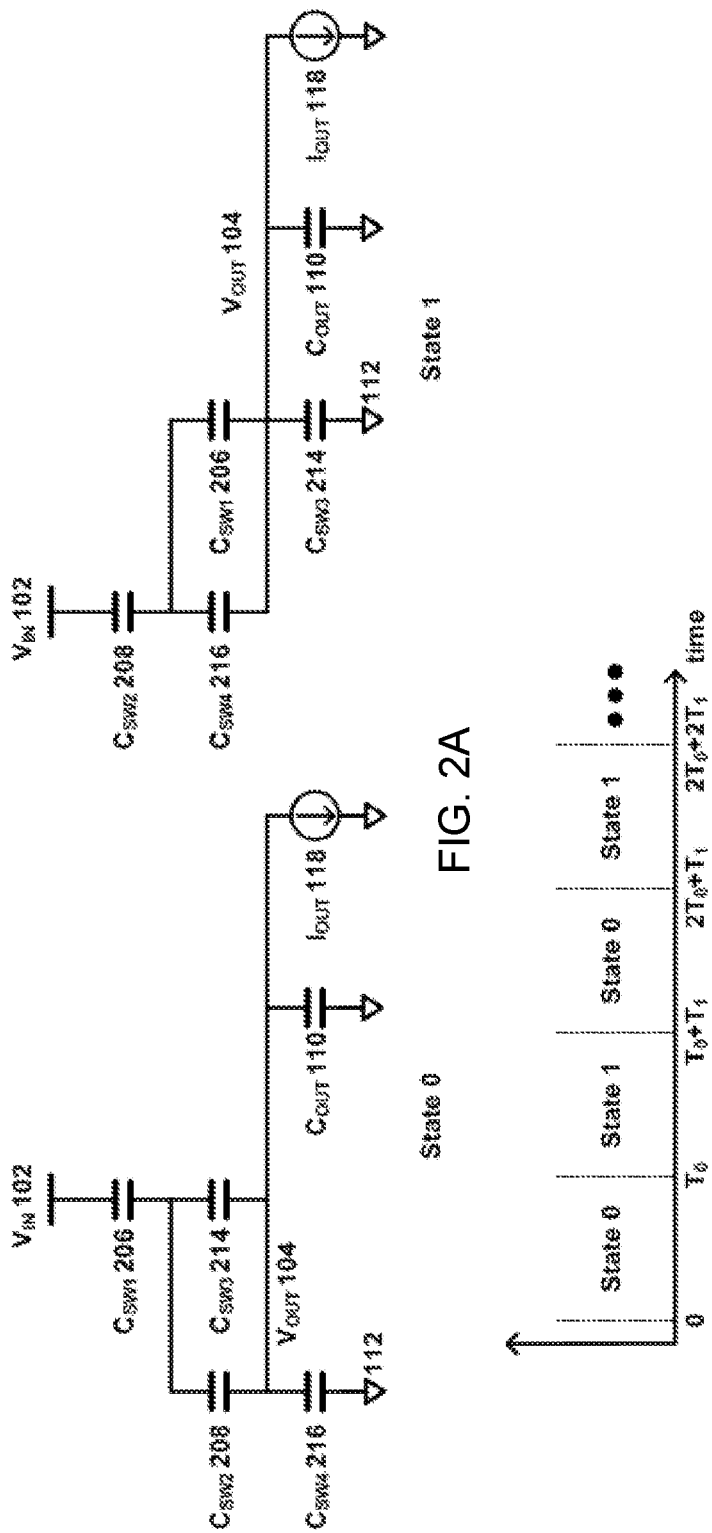

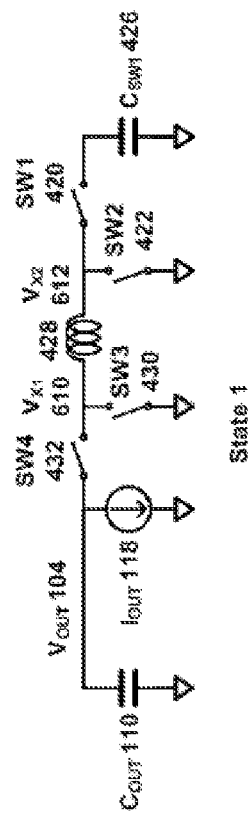
FIG. 6A
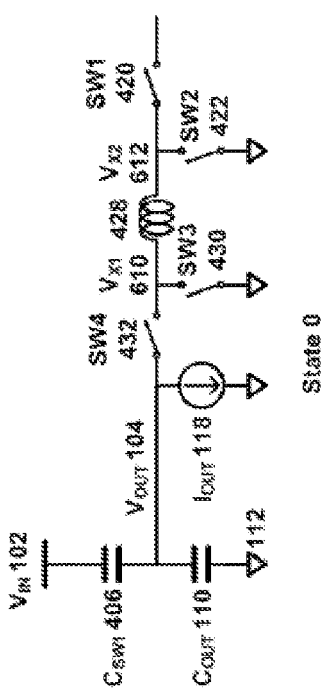
FIG. 6B
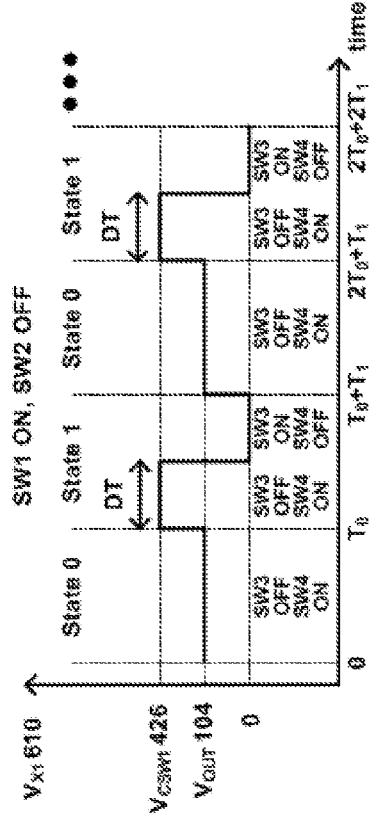
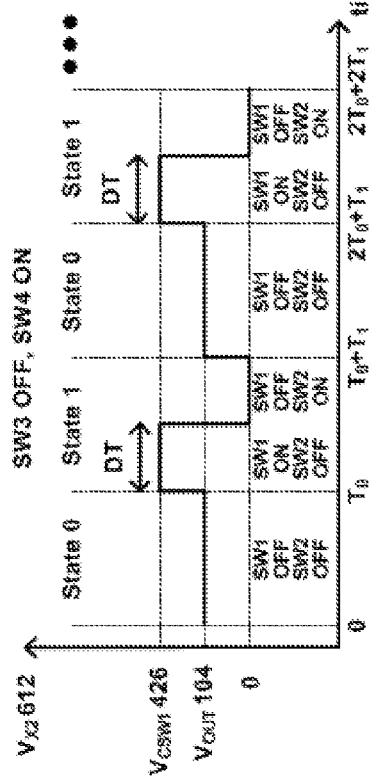
FIG. 6C

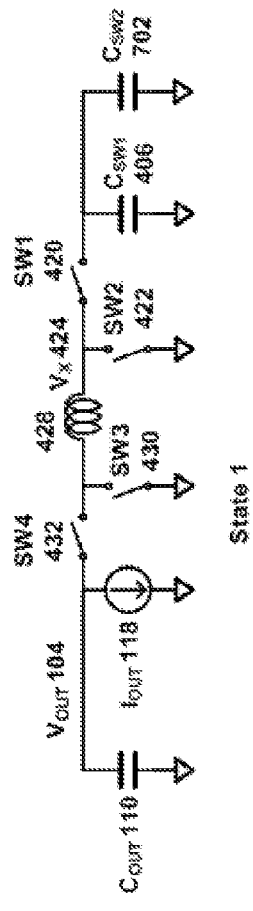
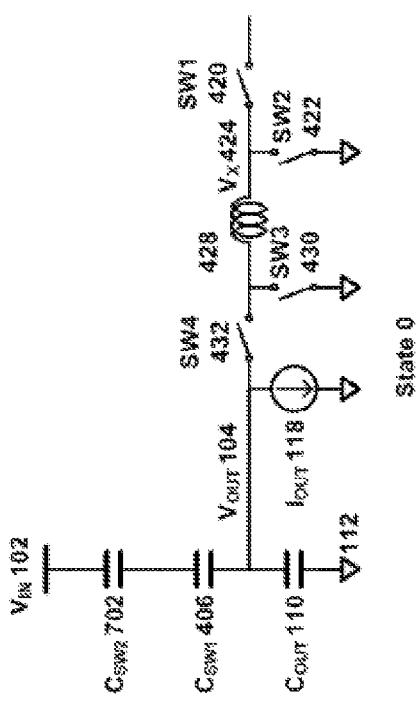
FIG. 7A
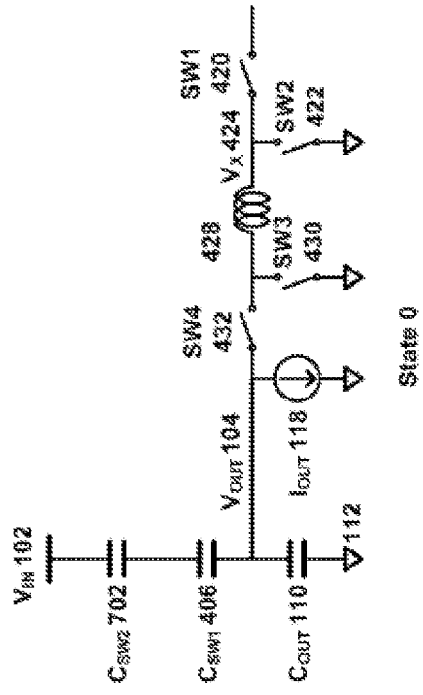
FIG. 7B

ASYMMETRIC SWITCHING CAPACITOR REGULATOR

CROSS REFERENCE TO RELATED APPLICATIONS

This application claims benefit of the earlier filing date, under 35 U.S.C. §119(e), of U.S. Provisional Application No. 62/148,901, filed on Apr. 17, 2015, entitled "ASYMMETRIC SWITCHING CAPACITOR REGULATOR," which is herein incorporated by reference in its entirety.

STATEMENT REGARDING FEDERALLY SPONSORED RESEARCH OR DEVELOPMENT

This invention was made with government support under 1353640 and 1447003 awarded by the National Science Foundation (NSF). The government has certain rights in the invention.

TECHNICAL FIELD

The present disclosure relates to an asymmetric switching capacitor regulator.

BACKGROUND

There is a strong demand to reduce the size of electronic systems. The size reduction is especially desirable in mobile electronics where space is a premium, but is also desirable in servers that are placed in big data centers since it is important to squeeze in as many servers as possible in a fixed real estate.

One of the largest components in electronic systems includes voltage regulators (also referred to as power regulators). Power regulators often include a large number of bulky off-chip components to deliver voltages to integrated chips, including processors, memory devices (e.g., a dynamic read access memory (DRAM)), radio-frequency (RF) chips, WiFi combo chips, and power amplifiers. Therefore, it is desirable to reduce the size of the voltage regulators in electronic systems.

Power regulators include semiconductor chips, such as a DC-DC regulator chip, that deliver power from a power source (e.g., a battery) to an output load. The output load can include a variety of integrated chips (e.g., an application processor, a DRAM, a NAND flash memory) in an electronic device. To efficiently deliver power, a voltage regulator can use a "buck" topology. Such a regulator is referred to as a buck regulator. A buck regulator transfers charges from the power source to the output load using an inductor. A buck regulator can use power switches to connect/disconnect the inductor to one of multiple voltages, thereby providing an output voltage that is a weighted average of the multiple voltages. A buck regulator can adjust the output voltage by controlling the amount of time the inductor is coupled to one of the multiple voltages.

Unfortunately, a buck regulator is not suitable for highly integrated electronic systems. The conversion efficiency of a buck regulator depends on the size of the inductor, in particular when the power conversion ratio is high and when the amount of current consumed by the output load is high. Because an inductor can occupy a large area and is bulky to integrate on-die or on-package, existing buck regulators often use a large number of off-chip inductor components. This strategy often requires a large area on the printed circuit board, which in turn increases the size of the electronic device. The challenge is exacerbated as mobile system-on-chips (SoCs) become more complex and need an increasingly larger number of voltage domains to be delivered by the voltage regulator.

Another type of power regulators is a switched-capacitor regulator, where capacitors are used instead of inductors. Unfortunately, switched-capacitors are efficient only at certain input to output voltage ratios and become power-inefficient when the ratio deviates from the pre-determined values.

SUMMARY

Some embodiments of the disclosed subject matter include a voltage regulator. The voltage regulator is configured to receive an input voltage at an input node and to provide an output voltage at an output node. The voltage regulator comprises an inductor, a first capacitor configured to accommodate a first voltage, and a second capacitor configured to accommodate a second voltage. The voltage regulator also includes a switch matrix that is configured to alternate between a first configuration and a second configuration, wherein, in the first configuration, the switch matrix is configured to couple the first capacitor and the second capacitor in a parallel relationship through the inductor, and wherein, in the second configuration, the switch matrix is configured to couple the first capacitor and the second capacitor in a series relationship between the input node and a ground node. The voltage regulator can also include a plurality of power switches configured to induce a current through the inductor to provide a voltage differential between the first voltage and the second voltage in the first configuration.

In some embodiments of the voltage regulator disclosed herein, in the first configuration, the inductor and the first capacitor are in a series relationship, and the inductor and the first capacitor are collectively in a parallel relationship with the second capacitor.

In some embodiments of the voltage regulator disclosed herein, the first capacitor is a switching capacitor and the second capacitor is a decoupling capacitor.

In some embodiments of the voltage regulator disclosed herein, the first capacitor and the second capacitor are switching capacitors that are, in the first configuration, at a same layer of a stack of capacitors coupling the input node and the ground node.

In some embodiments of the voltage regulator disclosed herein, in the second configuration, the second capacitor is coupled to the output node and is in parallel with a decoupling capacitor.

In some embodiments of the voltage regulator disclosed herein, the plurality of power switches comprises a first switch and a second switch, wherein, in the first configuration, the first switch and the second switched are configured to alternate between a first state and a second state with a predetermined duty cycle to provide the voltage differential between the first capacitor and the second capacitor.

In some embodiments of the voltage regulator disclosed herein, in the first state, the first switch is turned on and the second switch is turned off to couple the first capacitor and the second capacitor in parallel through the inductor, and in the second state, the first switch is turned off and the second switch is turned on to de-couple the first capacitor and the second capacitor.

In some embodiments of the voltage regulator disclosed herein, the first switch is disposed between the output node and the inductor.

In some embodiments of the voltage regulator disclosed herein, the first switch is disposed between the inductor and the first capacitor.

In some embodiments of the voltage regulator disclosed herein, the output voltage of the voltage regulator is determined based on the predetermined duty cycle.

In some embodiments of the voltage regulator disclosed herein, the voltage regulator further includes a third capacitor, wherein in the second configuration, the switch matrix is configured to cause the third capacitor to be in a series relationship with the first capacitor.

In some embodiments of the voltage regulator disclosed herein, in the first configuration, the switch matrix is configured to couple the third capacitor to the output node in parallel with the second capacitor.

In some embodiments of the voltage regulator disclosed herein, in the first configuration, the switch matrix is configured to cause the third capacitor to be coupled to the first capacitor in parallel.

In some embodiments of the voltage regulator disclosed herein, the inductor has an inductance in the range of 1-100 nH.

In some embodiments of the voltage regulator disclosed herein, the inductor is on-chip or on-package.

In some embodiments of the voltage regulator disclosed herein, the inductor has an inductance in the range of 100 nH-10 uH.

Some embodiments of the disclosed subject matter include an electronic system. The electronic system includes a voltage regulator in accordance with some embodiments, wherein the voltage regulator is configured to operate in a reverse direction in which the output node in the voltage regulator is coupled to an input voltage source and the input node of the voltage regulator is coupled to a target load.

In some embodiments of the electronic system disclosed herein, the electronic system operating the voltage regulator in the reverse direction is configured to operate the voltage regulator as a step-up regulator.

Some embodiments of the disclosed subject matter include an electronic system, which includes a voltage regulator in accordance with some embodiments, and a target load system coupled to the voltage regulator, wherein the output node of the voltage regulator is coupled to the target load system.

In some embodiments of the electronic system disclosed herein, the electronic system comprises a mobile communication device.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be had to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 1A-1B illustrate a symmetric switching capacitor regulator and its operation.

FIGS. 2A-2B illustrate a 3:1 ladder switching capacitor regulator and its operation.

FIGS. 6A-6C illustrate an asymmetric switching capacitor regulator that is capable of providing an output voltage in the entire desired output voltage range in accordance with some embodiments.

FIGS. 7A-7B illustrate an asymmetric switching capacitor regulator that is based on a 3:1 switching capacitor regulator in accordance with some embodiments.

DETAILED DESCRIPTION

Figure 3A:
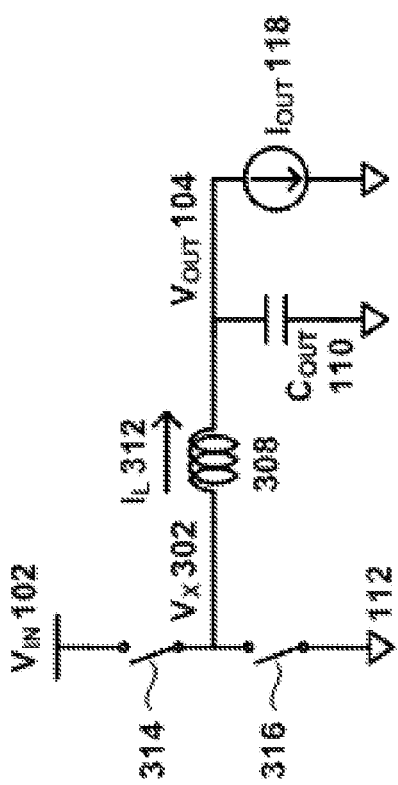
FIGS. 3A-3B illustrate a buck regulator and its operation and its operation.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Modern electronic systems have been tightly integrated as a system-on-chip (SoC) that incorporates multiple processing cores and heterogeneous components (e.g., memory controllers, hardware accelerators) within a single chip. The popularity of SoCs, coupled with tighter power budgets, motivates controlling the voltage and frequency at a block-specific granularity. The block-specific voltage control can allow the electronic system to raise only the voltage of the computing blocks (e.g., processor cores) that desires higher performance. Such a block-specific voltage control can improve power and/or performance.

However, traditional approaches of dynamic voltage and frequency scaling (DVFS) have been performed at a coarse-grain level due to cost and size limitations of off-chip voltage regulators. Moreover, traditional DVFS schemes were limited to a slow voltage/frequency scaling at the micro-second timescale due to the slow speed of off-chip voltage regulators. Faster DVFS in the nano-second timescale can save significantly more power consumed by the SoC by closely tracking the SoC voltage to the rapidly changing computation demand.

Given the drawback of off-chip voltage regulators, there has been a surge of interest in building integrated voltage regulators (IVR)—a voltage regulator that is integrated with other components (e.g., processor cores) in a single chip or in a single package—to reduce board size and to enable nanosecond timescale, per-core DVFS.

An IVR can include a variety of voltage regulators, including a switching regulator and a low-dropout linear regulator. IVRs that can reduce the board size and can enable nanosecond timescale, per-core DVFS are disclosed in "System Level Analysis of Fast, Per-Core DVFS using On-Chip Switching Regulators," published in IEEE International Symposium on High-Performance Computer Architecture (HPCA) in February 2008, by Wonyoung Kim et al.; an article entitled "Design Techniques for Fully Integrated Switched-Capacitor DC-DC Regulators," published in IEEE Journal of Solid-State Circuits (JSSC) in September 2011, by Hanh-Phuc Le et al.; and an article entitled "A Fully-Integrated 3-Level DC/DC Regulator for Nanosecond-Scale DVFS," published in IEEE Journal of Solid-State Circuits (JSSC) in January 2012, by Wonyoung Kim et al., each of which is hereby incorporated herein by reference in its entirety.

A switching regulator can include a switching capacitor (SC) regulator. A switching capacitor regulator can use one or more capacitors, instead of inductors, to transfer charges from a power source to an output load. The switching capacitor regulator can control the output voltage by changing the configuration and the sequence in which capacitors are connected to one another.

Unfortunately, efficiencies of switching capacitor regulators can degrade at output voltages that are not a predetermined fraction of the input voltage. For example, a switching capacitor regulator can achieve high efficiencies at $1/2$, $1/3$, $2/3$, $2/5$, $3/5$ of the input voltage. However, the same switching capacitor regulator can fail to provide high efficiencies when the output voltage deviates from those values. This is a problem for many SoCs that operate within a continuous range of voltages, or a range of voltages in 5-10 mV steps.

FIGS. 1A-1B illustrate a symmetric switching capacitor regulator that can achieve high efficiency when the output voltage $V_{OUT}$ 104 is close to a fraction of an input voltage $V_{IN}$ 102. In this particular example, the fraction is $1/3$. The switching capacitor regulator includes a plurality of capacitors $C_{SW1}$ 106, $C_{SW2}$ 108, and $C_{OUT}$ 119, and a switch matrix (not shown in figure for simplicity). A switch matrix can include a plurality of switches.

In a switching capacitor regulator, switching capacitors $C_{SW1}$ 106 and $C_{SW2}$ 108 can be connected in different ways depending on how the switch matrix is connected and disconnected, while a decoupling capacitor $C_{OUT}$ 119 is always coupled to the output $V_{OUT}$ 104 to reduce noise on the output. The decoupling capacitor $C_{OUT}$ 119 is usually a large capacitor that reduces the noise or ripple of the output voltage $V_{OUT}$ 104.

Depending on the configuration of the switch matrix, the switching capacitor regulator can be in State 0 or State 1. The switches can turn on and off periodically (e.g., at a certain frequency) so that the switching capacitors $C_{SW1}$ 106, $C_{SW2}$ 108 alternate between State 0 and 1 periodically as well. As shown in FIG. 1B, the regulator can spend time $0$-$T_0$ in State 0 and $T_0$-$(T_0+T_1)$ in State 1.

In State 1, the first voltage $V_{SW1}$ across the switch capacitor $C_{SW1}$ 106 and the second voltage $V_{SW2}$ across $C_{SW2}$ 108 are equal to the output voltage $V_{OUT}$ 104. Assuming that the switching capacitors $C_{SW1}$ 106, $C_{SW2}$ 108 are large enough, the first and second voltages ($V_{SW1}$ and $V_{SW2}$) can stay roughly the same in both States 0 and 1. Therefore, when the capacitor configuration changes to State 0, the relationship between $V_{IN}$ 102 and $V_{OUT}$ 104 can be computed as $V_{IN}=V_{OUT}+V_{SW1}+V_{SW2}=3\times V_{OUT}$. Therefore, the output voltage $V_{OUT}$ 104 can be set to $1/3$ of $V_{IN}$ 102 in this specific example. This switching capacitor regulator is sometimes referred to as a 3:1 step-down switching capacitor regulator. More particularly, this specific type of switching capacitor regulator is sometimes referred to as a 3:1 series-to-parallel switching capacitor regulator because the two switching capacitors $C_{SW1}$ 106, $C_{SW2}$ 108 are connected in series in State 0, and connected in parallel in State 1. The output load that consumes the current 118 can be any type of an electronic device, including processors, memory (e.g., DRAM, NAND flash), RF chips, WiFi combo chips, and power amplifiers.

Oftentimes, the fractional value of the input voltage $V_{IN}$ 102 at which the switching capacitor regulator achieves high efficiency is determined by the number of stacked capacitors between the input node and the ground during State 0. For example, in FIG. 1A, the number of stacked capacitors between the input node (e.g., the node at which the input voltage $V_{IN}$ 102 is provided) and the ground node is 3. Therefore, the switching capacitor regulator achieves a high efficiency when its output voltage is $1/3$ of the input voltage $V_{IN}$ 102. When the number of stacked capacitors between the input node and the ground node is increased to N, the switching capacitor regulator can achieve a high efficiency when its output voltage is $1/N$ of the input voltage $V_{IN}$ 102.

A capacitor in a stacked capacitor configuration can be associated with a "layer" within the stack. For example, when the stacked capacitor configuration between the input node and the ground node has 3 capacitors, as in State 0 of FIG. 1A, the capacitor connected to the ground node (e.g., $C_{OUT}$ 110) is said to be at a first layer; the capacitor connected to the input node (e.g., $C_{SW1}$ 106) is said to be at a third layer; and the capacitor sandwiched between the first layer and the third layer (e.g., $C_{SW2}$ 108) is said to be at a second layer. In some cases, the layer of a particular capacitor within a stack of capacitors can be determined by counting the minimum number of capacitors between the particular capacitor and the ground in a series relationship. A first capacitor and a second capacitor are said to be at the same layer within the stack of capacitors when (1) the minimum number of capacitors between the first capacitor and the ground node in a series relationship, and (2) the minimum number of capacitors between the second capacitor and the ground node in a series relationship, are the same.

FIGS. 2A-2B illustrate a 3:1 ladder switching capacitor regulator, which is slightly different from FIG. 1 in how the switching capacitors are connected. Similar to FIG. 1, the capacitors alternate between States 0 and 1 using a switch matrix (not drawn in this figure for simplicity) that connect and disconnect the switching capacitors. As shown in FIG. 2B, the regulator can spend time $0-T_0$ in State 0 and $T_0$-$(T_0+T_1)$ in State 1.

In State 0, the voltage $V_{SW4}$ across $C_{SW4}$ 216 is equal to the output $V_{OUT}$ 104, and the voltage $V_{SW2}$ across $C_{SW2}$ 208 is equal to the voltage $V_{SW3}$ across $C_{SW3}$ 214. In State 1, the voltage $V_{SW3}$ across $C_{SW3}$ 214 is equal to the output voltage $V_{OUT}$ 104, and the voltage $V_{SW4}$ across $C_{SW4}$ 216 is equal to the voltage $V_{SW1}$ across $C_{SW1}$ 206. To summarize:

In State 0: $V_{SW4}=V_{OUT}$, $V_{SW2}=V_{SW3}$, $V_{IN}=V_{SW1}+V_{SW2}+V_{OUT}$ In State 1: $V_{SW3}=V_{OUT}$, $V_{SW4}=V_{SW1}$, $V_{IN}=V_{SW1}+V_{SW2}+V_{OUT}$ Assuming all capacitor values are large enough to make the voltages across them stay roughly the same in both State 0 and 1, $V_{SW1}$, $V_{SW2}$, $V_{SW3}$, $V_{SW4}$ all become roughly equal to $V_{OUT}$. As a result, the relationship between $V_{IN}$ 102 and $V_{OUT}$ 104 can be computed as $V_{IN}=V_{SW1}+V_{SW2}+V_{OUT}=3\times V_{OUT}$. This specific type of switching capacitor regulator is called a 3:1 ladder switching capacitor regulator because the way the two switching capacitors $C_{SW4}$ 216, $C_{SW2}$ 208 are connected in series, and two switching capacitors $C_{SW3}$ 214, $C_{SW3}$ 214 are connected in series, looks like two ladders side-by-side.

More generally, similar to the switching capacitor regulator of FIG. 1A, when the number of stacked capacitors (e.g., a number of capacitors in a series relationship) between the input node and the ground node is N, the ladder switching capacitor regulator can achieve a high efficiency when its output voltage is 1/N of the input voltage $V_{IN}$ 102. In the particular case of FIG. 2A, the number of capacitors in a series relationship is 3 (e.g., $C_{SW1}$ 206-$C_{SW3}$ 214-$C_{OUT}$ 110). Therefore, the particular ladder switching capacitor regulator of can achieve a high efficiency when its output voltage is ⅓ of the input voltage $V_{IN}$ 102.

In the two examples illustrated in FIGS. 1-2, the switching capacitor regulators can set $V_{OUT}$ 104 to be ⅓ of $V_{IN}$ 102 with relatively high power efficiency (e.g., without significant power loss). However, considering real-world second order effects, the capacitor voltages do not stay steady in State 0 and 1 as assumed in the equations above, but change as the capacitors are charged and discharged over time. This allows the switching capacitor regulators to provide an output voltage $V_{OUT}$ 104 that deviates from ⅓ of $V_{IN}$ 102.

However, as the output voltage $V_{OUT}$ 104 deviates further from ⅓ of $V_{IN}$ 102, the switching capacitor regulator would consume more power to regulate the output voltage $V_{OUT}$. As a result, the power efficiency of the switching capacitor regulator would degrade as the output voltage $V_{OUT}$ 104 deviates further from ⅓ of $V_{IN}$ 102. This is a problem for SoCs that need the regulator to provide a voltage that covers a wide voltage range in small steps (around 5 mV).

The present disclosure provides an asymmetric switching capacitor regulator that is capable of providing an output voltage, covering a wide voltage range, with a high efficiency. The disclosed switching capacitor regulator is configured to generate a wide range of an output voltage by differentiating a voltage across one or more switching capacitors from a voltage across the rest of the switching capacitors in the switching capacitor regulator.

Conventional switching capacitor regulators are only good at setting the output voltage to a predetermined fraction of the input voltage in part because the voltage across all switching capacitors are equal during, for example, State 1 of FIG. 1A. Using more switching capacitors does not help in this regards. By stacking more switching capacitors in State 0, the regulator can set the output to be ½, ⅓, ¼, ⅕ (and so on) of the input voltage, but the regulator cannot provide an output voltage that deviates from a fraction of an input voltage with a high efficiency.

However, when one or more switching capacitors are associated with different voltages, the output voltage of the switching capacitor can deviate from a fraction of an input voltage with a high efficiency. For example, instead of stacking three switching capacitors with voltages that all equal $V_{OUT}$, suppose that the three switching capacitors have voltages that equal to $V_{OUT}$, $V_{OUT}$, $1.2\times V_{OUT}$, respectively. In this case, $V_{IN}$ would be computed as $V_{IN}=V_{OUT}+V_{OUT}+1.2\times V_{OUT}=3.2\times V_{OUT}$. Therefore, the output voltage $V_{OUT}$ can be set to $1/(3.2)$ of $V_{IN}$, which is not a fractional value of the input voltage that is determined based on the number of capacitors in the stack.

This shows that, if the switching capacitor regulator can set the switching capacitor voltage to be an arbitrary value, the switching capacitor regulator can provide an arbitrary output voltage that is not fixed to a fractional value of the input voltage $V_{IN}$. The present disclosure provides switching capacitor regulators that are capable of setting a voltage across a switching capacitor to an arbitrary value. This way, the regulators can provide an output voltage that is not a fractional value of the input voltage that is determined based on the number of capacitors in a capacitor stack. Several embodiments of an asymmetric switching capacitor regulator disclosed herein use one or more inductors to set a voltage across a switching capacitor to an arbitrary value. The voltage regulators disclosed herein are collectively referred to as an asymmetric switching capacitor regulator.

There are at least two main advantages to an asymmetric switching capacitor regulator. First, the regulator can set $V_{OUT}$ to be any value and not be fixed at predetermined ratios of $V_{IN}$. Second, the regulator can regulate across a wide range of $V_{OUT}$ using less capacitors than a symmetric switching capacitor regulator. For example, suppose the desired range of the output voltage $V_{OUT}$ is 0.6~1.4V and $V_{IN}$ is 3.6V. A symmetric switching capacitor regulator needs the capacitor voltage to be $V_{OUT}$, so it needs at least 6 stacked capacitors to support the minimum $V_{OUT}$ of 0.6V (3.6/0.6=6). However, an asymmetric switching capacitor regulator can set a switching capacitor voltage to be different from $V_{OUT}$. Therefore, the number of capacitors in the asymmetric switching capacitor regulator can be less than the number of capacitors in the symmetric switching capacitor regulator.

Figure 3B:
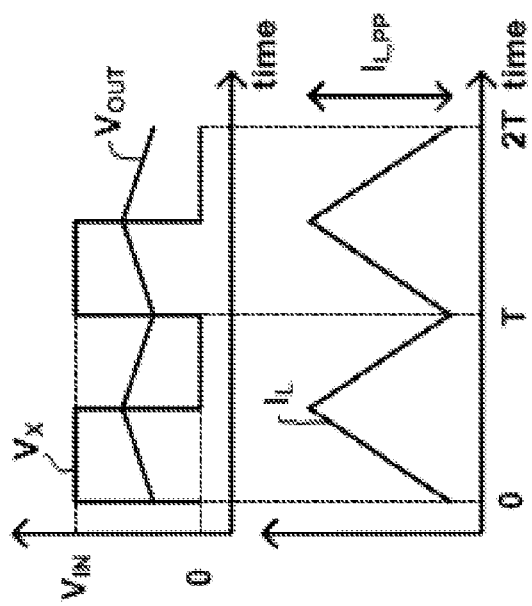

The operation of an asymmetric switching capacitor regulator is related to an operation of a buck regulator. FIGS. 3A-3B illustrate a buck regulator and its operation. The buck regulator 300 can include an inductor 308 and two switches 314, 316. The buck regulator 300 can connect the inductor 308 to a first voltage source $V_{IN}$ 102 and a second voltage source 112 through a set of power switches 314, 316. In some cases, the second voltage source 112 can include a ground voltage source. The power switches 314, 316 can be turned on and off using external inputs. In some cases, the power switches 314, 316, can be controlled so that the two switches are not turned on at the same time. The power switches 314, 316 can include transistors.

As illustrated in FIG. 3B, as the power switches 314, 316 turn on and off with a period T, the input of the inductor $V_X$ 302 can swing between 0 and $V_{IN}$ 102 with a period T. The inductor 308 and capacitor 110 operate as a low-pass filter that averages $V_X$ 302 over time, thereby creating a signal at the regulator output $V_{OUT}$ 310 with a small voltage ripple. The output voltage $V_{OUT}$ 104 can depend on the amount of time the inductor 308 is coupled to the first voltage source $V_{IN}$ 102 and the amount of time the inductor 308 is coupled to the second voltage source 318. For example, the buck regulator 300 can adjust the output voltage $V_{OUT}$ 310 to $V_{IN}D+(0V)(1-D)$, where D, a number between 0 and 1, is the portion of time $V_X$ is coupled to $V_{IN}$. D is also referred to as a duty cycle.

In some embodiments, an asymmetric switching capacitor regulator can use a property of the buck regulator 300 that it can provide a voltage differential between the output voltage $V_{OUT}$ 310 and the input voltage $V_{IN}$ by temporarily coupling the input node (e.g., a node that is coupled to the input voltage $V_{IN}$) to the output node (e.g., a node that is coupled to the output voltage $V_{OUT}$) through an inductor 308. This property is used in the asymmetric switching capacitor regulator to induce a voltage differential between capacitors in the asymmetric switching capacitor regulator: by temporarily coupling a first capacitor with a second capacitor through an inductor.

Figure 11B:
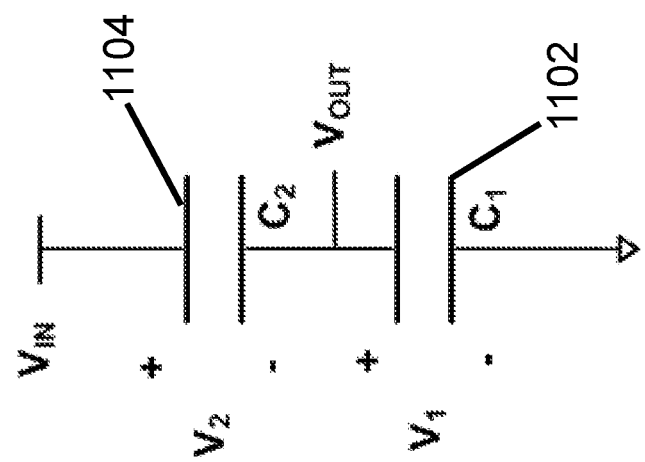
FIGS. 11A-11B illustrate how a voltage differential may be introduced between two capacitors and how the voltage differential can be used to generate an output voltage in accordance with some embodiments.
Figure 11A:
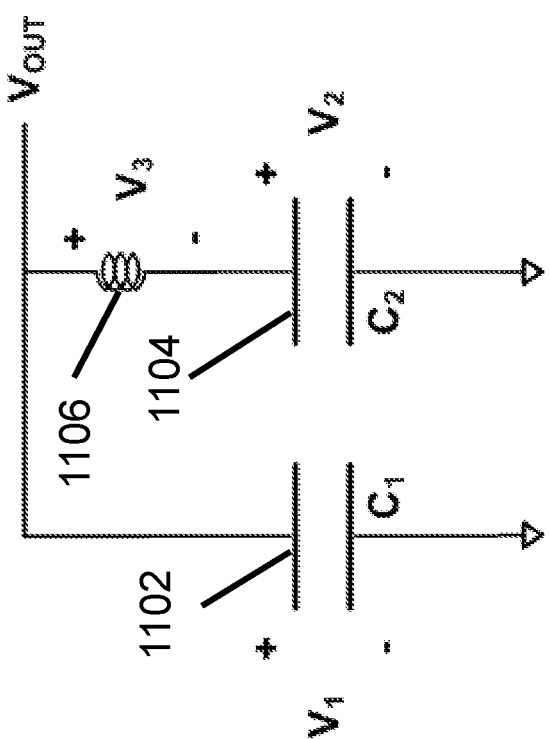

FIGS. 11A-11B illustrate how a voltage differential may be introduced between two capacitors and how the voltage differential can be used to generate an output voltage in accordance with some embodiments. FIG. 11A shows a regulator that includes a first capacitor 1102, a second capacitor 1104, and an inductor 1106. The regulator can initiate its operation in State 0, which is shown in FIG. 11A. In this state, the first capacitor 1102 and the second capacitor 1104 are coupled in a parallel relationship through the inductor 1106: the second capacitor 1104 is connected to the output node via an inductor 1106, which is unlike traditional switching capacitor regulators. Two capacitors are said to be in a parallel relationship through an inductor when the two capacitors are otherwise in a parallel relationship but for an inductor that is disposed between the capacitors.

In this state, the asymmetric switching capacitor regulator can induce a voltage differential between the first capacitor 1102 and the second capacitor 1104 by inducing a current through the inductor 1106. In some embodiments, the inductor 1106 can be connected to (e.g., switched to) different voltages, as in a buck regulator, to induce a current through the inductor 1106, and this current through the inductor 1106 can create a voltage differential between the first capacitor 1102 and the second capacitor 1104.

Once the voltage differential is developed between the first capacitor 1102 and the second capacitor 1104, the regulator can switch to State 1, as shown in FIG. 11B. In this state, the first capacitor 1102 and the second capacitor 1104 are coupled in a series relationship between the input node and the ground node, independently of the inductor 1106. Therefore, the input voltage $V_{IN}$ is the sum of the voltage $V_1$ across the first capacitor 1102, which is equal to $V_{OUT}$, and the voltage $V_2$ across the second capacitor 1104. Said differently, $V_{OUT}=V_{IN}-V_2$. Since the voltage $V_2$ across the second capacitor 1104 can be varied continuously (e.g., by varying the duty cycle at which the inductor 1106 is switched during State 0), the output voltage $V_{OUT}$ can be varied continuously as well.

In some embodiments, the first capacitor 1102 can be a decoupling capacitor that is always coupled to an output node and a ground node, and the second capacitor 1104 can be a switching capacitor. In other embodiments, the first capacitor 1102 and the second capacitor 1104 can both be switching capacitors.

In some embodiments, when both of the first capacitor 1102 and the second capacitor 1104 are switching capacitors, then the first capacitor 1102 and the second capacitor 1104 can be associated with the same layer within a capacitor stack of a switching capacitor regulator during State 0.

Figure 4A:
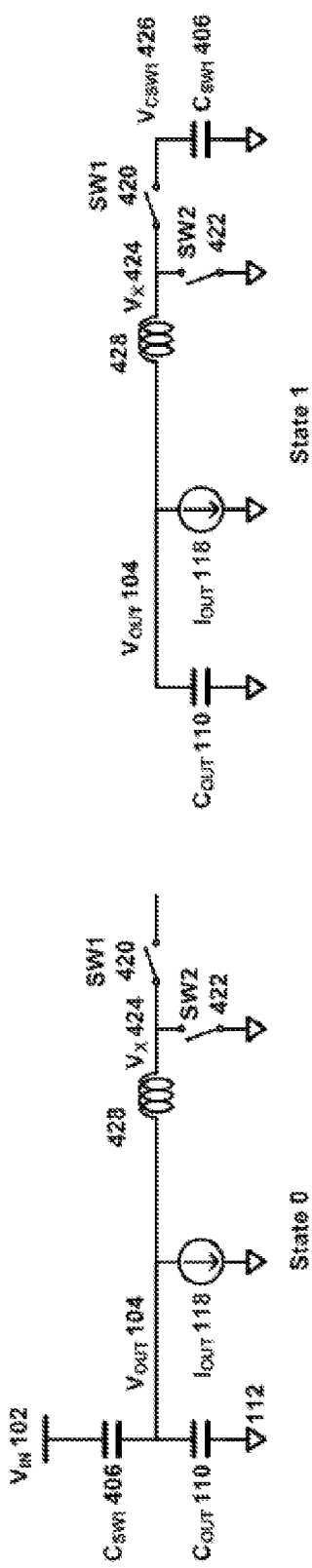
FIGS. 4A-4C illustrate an asymmetric switching capacitor regulator that is capable of providing an output voltage that is in a lower half of the desired output voltage range in accordance with some embodiments.

FIG. 4A illustrates an asymmetric switching capacitor regulator in accordance with some embodiments. Similar to a symmetric switching capacitor disclosed in FIGS. 1-2, there is one output decoupling capacitor $C_{OUT}$ 110 and one switching capacitor $C_{SW1}$ 406 that can switch positions using a switch matrix (not drawn in FIG. 4A for simplicity).

Figure 4B:
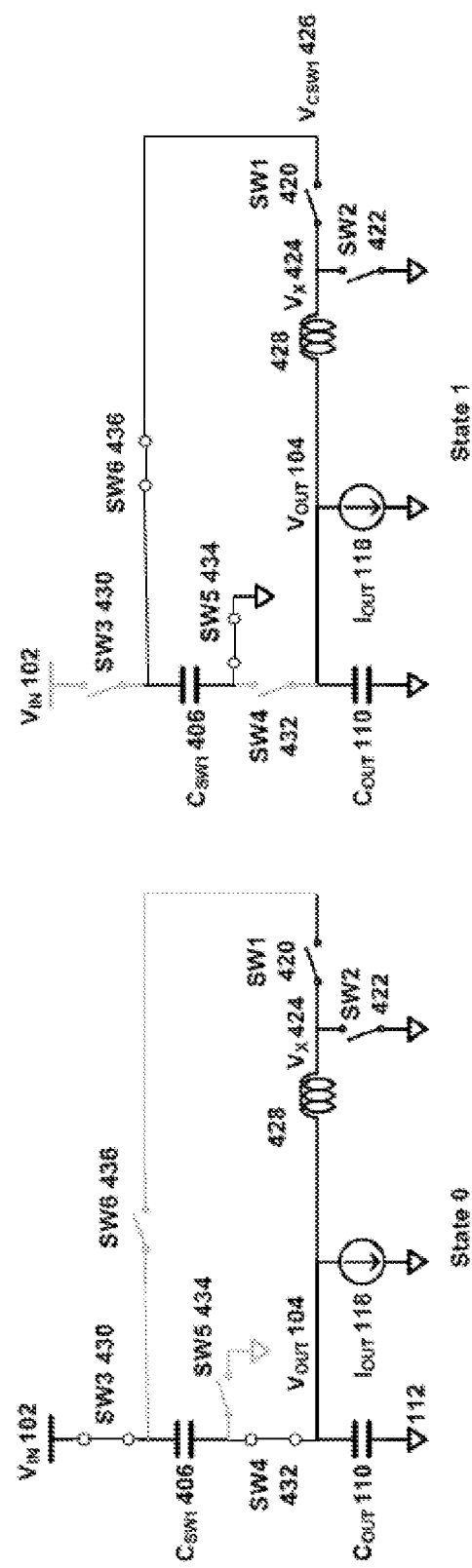

The asymmetric switching capacitor regulator is configured to alternate between State 0 and State 1 based on how $C_{SW1}$ 406 is connected. FIG. 4B illustrates a switch matrix coupled to the asymmetric switching capacitor regulator of FIG. 4A, in accordance with some embodiments. The switch matrix includes four switches SW3 430, SW4 432, SW5 434, and SW6 436 that are used to connect and disconnect the top and bottom plates of switching capacitor $C_{SW1}$ 406 to different nodes in State 0 and State 1. For example, in State 0, the switches SW3 430, SW4 432 are turned on and the switches SW5 434, SW6 436 are turned off; in State 1, the switches SW3 430, SW4 432 are turned off and the switches SW5 434, SW6 436 are turned on. For simplicity, the switch matrix associated with one or more switching capacitors is omitted in subsequent figures.

A difference between an asymmetric symmetric switching capacitor of FIG. 4A and symmetric switching capacitor regulators of FIGS. 1-2 is that in State 1, there is an inductor 428 between $C_{OUT}$ 110 and $C_{SW1}$ 406. This inductor 426 allows the voltage across $C_{OUT}$ 110, which is equal to the output voltage $V_{OUT}$ 104, and the voltage across $C_{SW1}$ 406 ($V_{CSW1}$ 426) to be different. Furthermore, $V_{CSW1}$ 426 is determined by a duty-cycle at which the power switches 420, 422 are turned on and off during State 1.

Figure 4C:
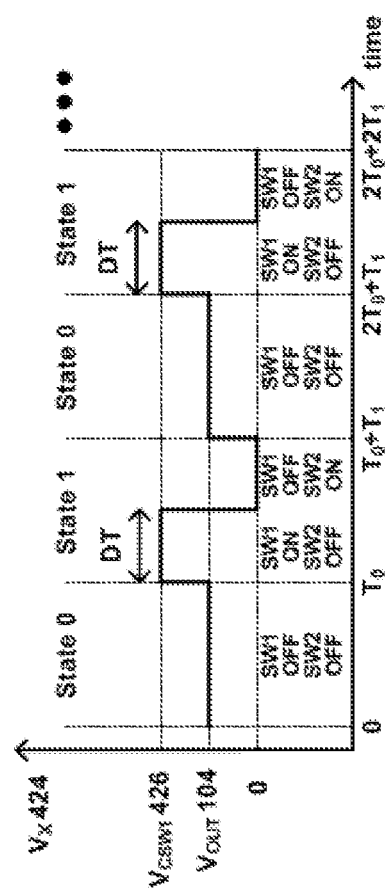

FIG. 4C shows an operation of an asymmetric switching capacitor regulator illustrated in FIG. 4A in accordance with some embodiments. In State 0, both switches 420, 422 can turn off and $V_X$ 424 can be equal to $V_{OUT}$ 104. In this state, the input voltage $V_{IN}$ 102 is independent of $V_X$ 424, and it can be computed as $V_{IN}$ 102=$V_{CSW1}$ 426+$V_{OUT}$ 104.

In State 1, the switches 420, 422 can operate similarly to power switches of a buck regulator, illustrated in FIG. 3A. For example, in State 1, the configuration is similar to a buck regulator where the input of the buck regulator is $V_{CSW1}$ 426 and the output of the buck regulator is $V_{OUT}$ 104. Therefore, the input voltage of the inductor $V_X$ 424 can swing between 0 and $V_{CSW1}$ 426 with a period that is equal to or less than $T_1$. In some sense, the asymmetric switching capacitor regulator is operating in two sub-states within State 1. For example, in sub-state 0 of State 1, SW1 is on and SW2 is off for the period of $DT_1$, and in sub-state 1 of State 1, SW1 is off and SW2 is on for the period of $(1-D)T_1$. In some cases, the two switches SW1 and SW2 may alternate between the two sub-states multiple times within State 1.

The two switches 420, 422 can adjust the level of $V_{OUT}$ 104 to $V_{CSW1}D+(0V)(1-D)$, where the duty cycle D, having a value between 0 and 1, indicates a fraction of $T_1$ that $V_X$ is coupled to $V_{CSW1}$ 426. Since the input voltage $V_{IN}$ 102 and the output voltage $V_{OUT}$ 104 are presumed to remain constant in State 0 and State 1, the relationship between $V_{IN}$ 102 and $V_{OUT}$ 104 can be determined as follows:

$$V_{OUT}104 = V_{CSW1}D + (0V)(1-D) = V_{CSW1}D$$
$$V_{IN}102 = V_{CSW1}426 + V_{OUT}104$$
$$= V_{CSW1}426 + V_{CSW1}D$$
$$= V_{CSW1}(1+D)$$
$$= V_{OUT}(1+D)/D$$

Therefore, the output voltage of the asymmetric switching capacitor regulator is determined as follows:

$$V_{OUT} = \frac{DV_{IN}}{D+1}$$

Since D indicates a duty cycle, the value of D is between 0 and 1. Therefore, the range of the output voltage $V_{OUT}$ 104 is 0V and $$\frac{V_{IN}}{2}.$$

A typical 2:1 switching capacitor regulator, without the inductor 428, is efficient only when $V_{OUT}$ 104 is around ½ of $V_{IN}$ 102. However, with the introduction of the inductor 428, the asymmetric switching capacitor regulator disclosed in FIG. 4A can be efficient across a wider voltage range $$\left(0V \text{ and } \frac{V_{IN}}{2}\right)$$

by adjusting the value of D. Since the asymmetric switching capacitor regulator of FIG. 4A provides an output voltage that is in the lower half of the range 0-$V_{IN}$, the asymmetric switching capacitor regulator of FIG. 4A can be referred to as a lower asymmetric switching capacitor regulator.

Figure 5A:
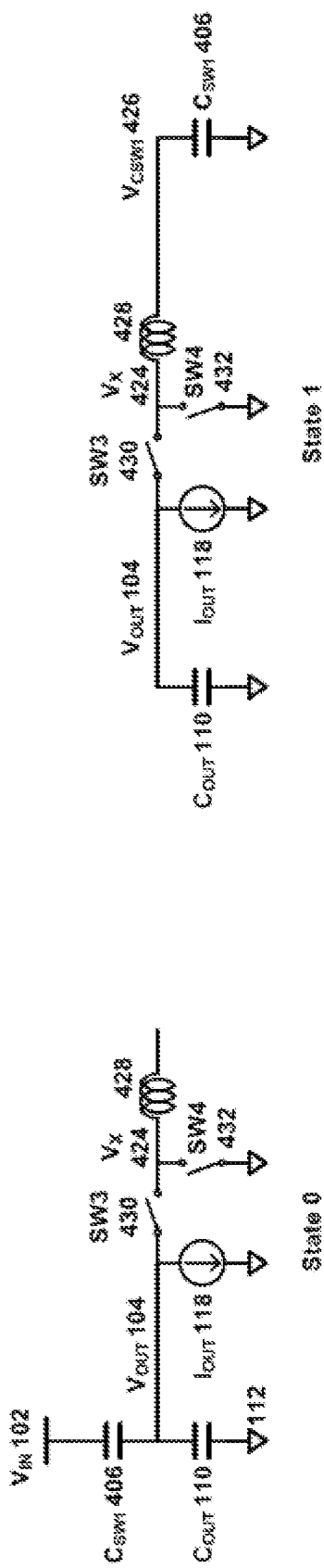
FIGS. 5A-5B illustrate an asymmetric switching capacitor regulator that is capable of providing an output voltage that is in an upper half of the desired output voltage range in accordance with some embodiments.

FIG. 5A illustrates an asymmetric switching capacitor regulator that is capable of providing an output voltage that is in the upper half of the range 0-$V_{IN}$ in accordance with some embodiments. Such an asymmetric switching capacitor is sometimes referred to as an upper asymmetric switching capacitor. A difference between the asymmetric switching capacitor regulator of FIG. 4A and the asymmetric switching capacitor regulator of FIG. 5A is the location of switches SW3 430 and SW4 432 with respect to the inductor 428. The switches SW3 430 and SW4 432 again operate similarly to power switches in a buck regulator. However, in FIG. 5A, the input voltage to the buck regulator is $V_{OUT}$ 104 and the output voltage to the buck regulator is $V_{CSW1}$ 426, which is the opposite of the configuration in FIG. 4A. Similar to the regulator in FIG. 4A, the relationship between $V_{IN}$ 102 and $V_{OUT}$ 104 can be computed as follows:

$$V_{CSW1}426 = V_{OUT}D + (0V)(1-D) = V_{OUT}D$$
$$V_{IN}102 = V_{CSW1}426 + V_{OUT}104$$
$$= V_{OUT}D + V_{OUT}$$
$$= V_{OUT}(1+D)$$

Therefore, the output voltage of the asymmetric switching capacitor regulator in FIG. 5A is determined as follows:

$$V_{OUT} = \frac{V_{IN}}{(D+1)}$$

Since D indicates a duty cycle, the value of D is between 0 and 1. Therefore, the range of the output voltage $V_{OUT}$ 104 of the asymmetric switching capacitor regulator in FIG. 5A is $$\frac{V_{IN}}{2}$$

and $V_{IN}$ 102.

In some embodiments, the lower asymmetric switching capacitor regulator of FIG. 4A and the upper asymmetric switching capacitor regulator of FIG. 5A can be combined into a single asymmetric switching capacitor regulator, thereby providing an output voltage in the full range of 0V-$V_{IN}$.

FIG. 6A illustrates an asymmetric switching capacitor regulator that is capable of providing an output voltage in the full range of 0V-$V_{IN}$ in accordance with some embodiments. The asymmetric switching capacitor regulator includes four switches SW1 426, SW2 428, SW3 430 and SW4 432. By turning the switches SW1 426, SW2 428, SW3 430 and SW4 432 on and off in a particular pattern, this regulator can operate either as a lower asymmetric switching capacitor regulator or an upper asymmetric switching capacitor regulator. For example, as illustrated in FIG. 6B, the asymmetric switching capacitor regulator of FIG. 6A can be used as a lower asymmetric switching capacitor regulator by turning off SW3 430 and turning on SW4 432 during the entire State 0 and State 1. As another example, as illustrated in FIG. 6C, the asymmetric switching capacitor regulator of FIG. 6A can be used as an upper asymmetric switching capacitor regulator by turning off SW2 422 and turning on SW1 420 during the entire State 0 and State 1. This way, $V_{OUT}$ 104 can be efficiently regulated to a value between 0 and $V_{IN}$ 102.

Figure 5B:
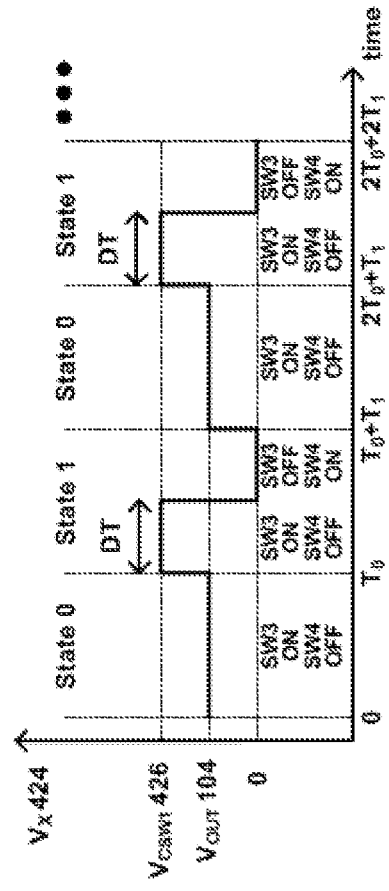

In some embodiments, an asymmetric switching capacitor regulator can include a plurality of switching capacitors. FIGS. 7A-7B illustrate an asymmetric switching capacitor regulator that is based on a 3:1 series-to-parallel switching capacitor regulator, instead of the 2:1 switching capacitor regulators as in FIGS. 4-6, in accordance with some embodiments.

FIG. 7A illustrates a regulator where $C_{SW1}$ 406 and $C_{SW2}$ 702 are switched to the opposite side of $V_{OUT}$ 104 in State 1. FIG. 7B illustrates a regulator in which $C_{SW2}$ 702 is switched to the same side of $V_{OUT}$ 104 in State 1. The switching location of $C_{SW2}$ 702 can be determined based on the target input-to-output $$\left(\frac{V_{IN}}{V_{OUT}}\right)$$

ratio.

For example, in FIG. 7A, voltages $V_{SW1}$ and $V_{SW2}$, across $C_{SW1}$ 406 and $C_{SW2}$ 702, respectively, are set by the duty cycle of switches SW1 426, SW2 428, SW3 430 and SW4 432. Let's assume SW1 420 is on and SW2 422 is off for the entire State 0 and State 1, and SW4 432 and SW3 430 are on and off with a duty cycle D. The relationship between $V_{IN}$ 102 and $V_{OUT}$ 104 can be computed as follows:

$$V_{CSW1} = V_{CSW2} = V_{OUT}D + (0V)(1-D) = V_{OUT}D$$

$$V_{IN}102 = V_{CSW1} + V_{CSW2} + V_{OUT}104$$
$$= 2V_{OUT}D + V_{OUT}$$
$$= V_{OUT}(1+2D)$$

As a result, $$\frac{V_{IN}}{V_{OUT}}$$

can be between 1 and 3.

As another example, in FIG. 7B, $V_{SW2}$ is equal to $V_{OUT}$ 104, and only $V_{SW1}$ is set by the duty cycle of switches. Let's assume the same condition where SW1 420 is on and SW2 422 is off for the entire State 0 and State 1, and SW4 432 and SW3 430 are on and off with a duty cycle D. The relationship between $V_{IN}$ 102 and $V_{OUT}$ 104 can be computed as follows:

$$V_{CSW1} = V_{OUT}D + (0V)(1-D) = V_{OUT}D$$

$$V_{CSW2} = V_{OUT}$$

$$V_{IN}102 = V_{CSW1} + V_{CSW2} + V_{OUT}104$$
$$= V_{OUT}D + V_{OUT} + V_{OUT}$$
$$= V_{OUT}(2+D)$$

As a result, $$\frac{V_{IN}}{V_{OUT}}$$

can be between 2 and 3.

In some embodiments, the asymmetric switching capacitor regulator can have more than 3 stacks of switching capacitors (e.g., 4 stacks, 5 stacks, 6 stacks and so on). This way, the asymmetric switching capacitor regulator can be formed based on, for example, 4:1, 5:1, 6:1 series-to-parallel switching capacitor regulators.

In some embodiments, when an asymmetric switching capacitor regulator includes a plurality of switching capacitors, as in FIG. 7A, each switching capacitor can be associated with a switch matrix, as provided in FIG. 4B. In some cases, each switch matrix can include four switches.

In some embodiments, asymmetric switching capacitor regulators can be designed not only based on series-to-parallel switching capacitor regulators, but also based on a ladder switching capacitor regulator, an example of which is illustrated in FIG. 2.

Figure 8A:
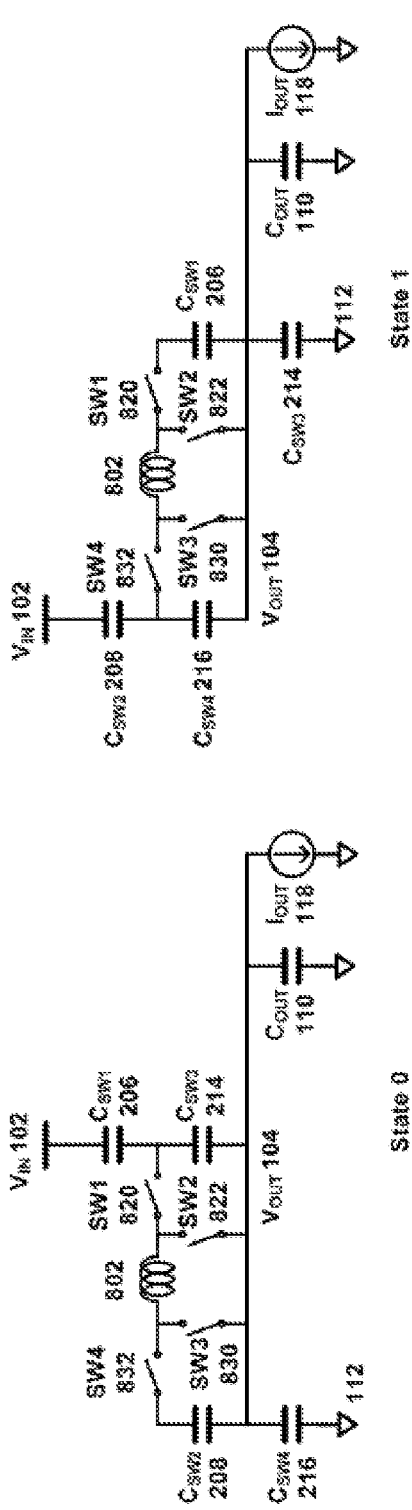
FIGS. 8A-8B illustrate an asymmetric switching capacitor regulator that is based on a ladder switching capacitor regulator in accordance with some embodiments.
Figure 8B:
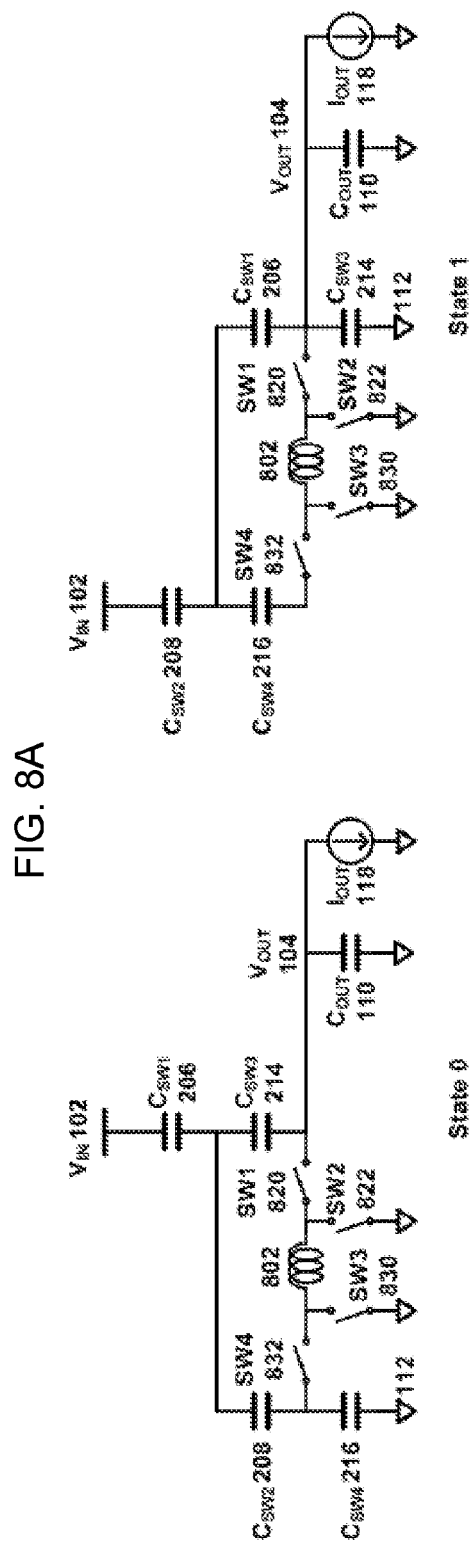

FIGS. 8A-8B illustrate an asymmetric switching capacitor regulator based on a ladder switching capacitor regulator in accordance with some embodiments. The ladder switching capacitor regulator used in FIGS. 8A-8B is a 3:1 ladder switching capacitor regulator. Unlike the traditional 3:1 ladder switching capacitor regulator illustrated in FIG. 2, there is an inductor 802 between $C_{SW2}$ 208 and $C_{SW3}$ 214 so that the voltages across these two capacitors, $V_{CSW2}$ and $V_{CSW3}$, respectively, can be different. Similar to the previous examples in FIGS. 4-7, the relationship between $V_{CSW2}$ and $V_{CSW3}$ can be set by a switch matrix SW1 820, SW2 822, SW3 830, SW4 832, connecting and disconnecting the inductor 802 on a certain duty-cycle.

In some embodiments, similar to FIG. 6A, by turning the switches SW1 820, SW2 822, SW3 830, SW4 832 on and off in a particular pattern, the regulator in FIG. 8A can operate either as a lower asymmetric switching capacitor regulator or an upper asymmetric switching capacitor regulator.

For example, in State 0, SW1 820 can be turned on and SW2 822 can be turned off, and SW4 832 and SW3 830 can be turned on and off with a duty cycle $D_0$. Also, in State 1, SW4 832 can be turned on and SW3 830 can be turned off, and SW1 820 and SW2 822 can be turned on and off with a duty cycle $D_1$. In this example, the relationship between $V_{IN}$ 102 and $V_{OUT}$ 104 can be computed as follows:

$$V_{CSW4} = V_{OUT}$$

$$V_{CSW3} = V_{OUT}$$

$$V_{CSW1} + V_{CSW3} = V_{CSW2} + V_{CSW4} \rightarrow V_{CSW1} = V_{CSW2}$$

$$V_{CSW3} = D_0 V_{CSW2} \rightarrow V_{OUT} = D_0 V_{CSW1}$$

$$V_{CSW4} = D_1 V_{CSW1} \rightarrow V_{CSW1} = V_{OUT}/D_1$$

$$D_0 = D_1$$

$$V_{IN}102 = V_{CSW1} + V_{CSW3} + V_{OUT}$$
$$= V_{OUT}/D_1 + V_{OUT} + V_{OUT}$$
$$= (2 + 1/D_1)V_{OUT}$$

As a result, $$\frac{V_{IN}}{V_{OUT}}$$

can be equal to or greater than 3. In contrast to the ladder switching capacitor regulator of FIG. 2A, $V_{CSW1}$, $V_{CSW2}$ are not equal to $V_{OUT}$ (e.g., $V_{CSW1} = V_{OUT}/D_1$). Therefore, the output voltage $V_{OUT}$ is not a fraction of the input voltage $V_{IN}$ determined by the number of stacks.

As another example, in State 0, SW4 832 can be turned on and SW3 830 can be turned off, and SW1 820 and SW2 822 can be turned on and off with a duty cycle $D_0$. Also, in State 1, SW1 820 can be turned on and SW2 822 can be turned off, and SW3 830 and SW4 832 can be turned on and off with a duty cycle $D_1$. In this example, the relationship between $V_{IN}$ 102 and $V_{OUT}$ 104 can be computed as follows, assuming that D0=D1:

$V_{CSW4} = V_{OUT}$ $V_{CSW3} = V_{OUT}$ $V_{CSW1} + V_{CSW3} = V_{CSW2} + V_{CSW4} \rightarrow V_{CSW1} = V_{CSW2}$ $V_{CSW2} = D_0 V_{CSW3} \rightarrow V_{CSW1} = D_0 V_{OUT}$ $V_{CSW1} = D_1 V_{CSW4} \rightarrow V_{CSW1} = D_1 V_{OUT}$ Therefore, D0=D1. Based on this relationship, the input voltage $V_{IN}$ 102 can be represented as follows:

$$V_{IN} = V_{CSW1} + V_{CSW3} + V_{OUT}$$
$$= D_0 V_{OUT} + V_{OUT} + V_{OUT}$$
$$= (2 + D_0) V_{OUT}$$

As a result, $$\frac{V_{IN}}{V_{OUT}}$$

can be between 2 and 3. Combined with the mode of operation disclosed in the previous example, the regulator in FIG. 8A can adjust $$\frac{V_{IN}}{V_{OUT}}$$

to be equal to or greater than 2.

In some embodiments, the inductor 802 can be provided in series with other switching capacitors within the regulator. For example, in FIG. 8B, the inductor 802 is in a different location. Unlike the traditional 3:1 ladder switching capacitor regulator illustrated in FIG. 2, there is an inductor 802 between $C_{SW4}$ 216 and $C_{OUT}$ 110 so that the voltages across these two capacitors, $V_{CSW4}$ and $V_{OUT}$, respectively, can be different.

In some embodiments, in State 0, SW1 820 can be turned on and SW2 822 can be turned off, and SW4 832 and SW3 830 can be turned on and off with a duty cycle $D_0$. Also, in State 1, SW4 832 can be turned on and SW3 830 can be turned off, and SW1 820 and SW2 822 can be turned on and off with a duty cycle $D_1$. The relationship between $V_{IN}$ 102 and $V_{OUT}$ 104 can be computed as follows:

$V_{CSW3} = V_{OUT}$ $V_{CSW1} + V_{CSW3} = V_{CSW1} + V_{CSW2} \rightarrow V_{CSW3} = V_{CSW2} = V_{OUT}$ $V_{CSW2} + V_{CSW4} = V_{CSW3} + V_{OUT} \rightarrow V_{CSW4} = V_{OUT}$ $D_0 V_{CSW4} = V_{OUT} \rightarrow D_0 = 1$ $D_1 V_{CSW3} = V_{CSW1} + V_{CSW3} - V_{CSW4} \rightarrow D_1 V_{OUT} = V_{CSW1}$ $V_{IN} 102 = V_{CSW1} + V_{CSW3} + V_{OUT}$
$= D_1 V_{OUT} + V_{OUT} + V_{OUT}$
$= (2 + D_1) V_{OUT}$ As a result, $$\frac{V_{IN}}{V_{OUT}}$$

can be between 2 and 3.

In some embodiments, in State 0, SW4 832 can be turned on and SW3 830 can be turned off, and SW1 820 and SW2 822 can be turned on and off with a duty cycle $D_0$. Also, in State 1, SW1 820 can be turned on and SW2 822 can be turned off, and SW3 830 and SW4 832 can be turned on and off with a duty cycle $D_1$. The relationship between $V_{IN}$ 102 and $V_{OUT}$ 104 can be computed as follows:

$V_{CSW3} = V_{OUT}$ $V_{CSW1} + V_{CSW3} = V_{CSW1} + V_{CSW2} \rightarrow V_{CSW3} = V_{CSW2} = V_{OUT}$ $V_{CSW2} + V_{CSW4} = V_{CSW3} + V_{OUT} \rightarrow V_{CSW4} = V_{OUT}$ $D_0 V_{OUT} = V_{CSW4} \rightarrow D_0 = 1$ $D_1 (V_{CSW1} + V_{CSW3} - V_{CSW4}) = V_{CSW3} \rightarrow D_1 V_{CSW1} = V_{OUT}$ $V_{IN} 102 = V_{CSW1} + V_{CSW3} + V_{OUT}$
$= V_{OUT} / D_1 + V_{OUT} + V_{OUT}$
$= (2 + 1/D_1) V_{OUT}$ As a result, $$\frac{V_{IN}}{V_{OUT}}$$

can be equal to or larger than 3. Combined with the configuration in the paragraph above, this regulator can adjust $$\frac{V_{IN}}{V_{OUT}}$$

to be equal to or larger than 2.

In some embodiments, the inductor 802 can be placed in different locations, as illustrated in FIGS. 8A-8B, depending on which one or more of the switching capacitors have asymmetric voltages. The configuration of FIGS. 8A-8B uses the characteristic that any switching capacitors that have an inductor in between them can have asymmetric voltages.

In some embodiments, an asymmetric switching capacitor regulator can be based on other types of switching capacitor regulators. For example, an asymmetric switching capacitor regulator can be based on a Dickson-type switching capacitor regulator. Any type of switching capacitor regulator can be turned into an asymmetric switching capacitor regulator by inserting one or more inductors between two or more switching capacitors.

In some embodiments, the asymmetric switching capacitor regulator can be operated as a part of a voltage regulator system. The voltage regulator system can operate in multiple interleaved phases (e.g., in a time-interleaved manner over a single period), and the asymmetric switching capacitor regulator can be used to provide an output voltage in one of the interleaved phases. For example, a voltage regulator system can include three sets of asymmetric switching capacitors that each operate 0 degrees, 120 degrees, 240 degrees out of phase, respectively. As another example, a voltage regulator system can include two sets of switching inductor regulator and an asymmetric switching capacitor regulator that each operate 0 degrees, 120 degrees, 240 degrees out of phase, respectively.

In some embodiments, the asymmetric switching capacitor regulator can be used as a step-up regulator by swapping the input node and the output voltage node of the asymmetric switching capacitor regulator.

Figure 9A:
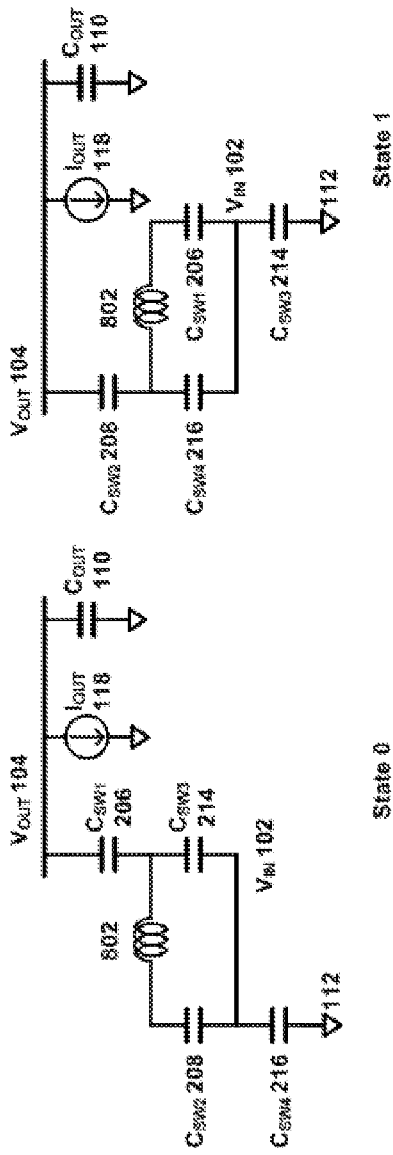
FIGS. 9A-9B illustrate a step-up asymmetric switching capacitor regulator in accordance with some embodiments.
Figure 9B:
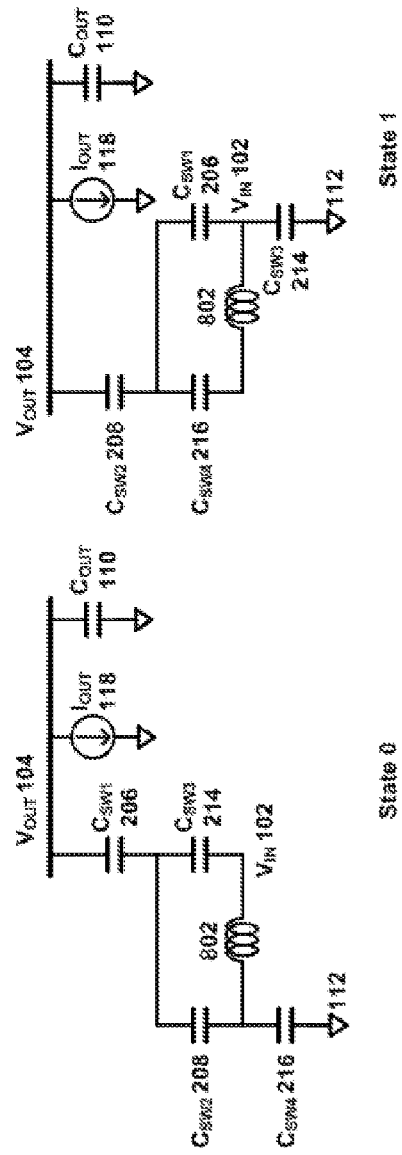

FIGS. 9A-9B illustrate step-up asymmetric switching capacitor regulators in accordance with some embodiments. The step-up asymmetric switching capacitor regulators of FIGS. 9A-9B are similar to the step-down regulators in FIGS. 8A-8B, respectively, except that the location of $V_{IN}$ 102 and $V_{OUT}$ 104 are swapped and $V_{IN}$ 102 is lower than $V_{OUT}$ 104. $I_{OUT}$ 118 and $C_{OUT}$ 110 are still connected to the output $V_{OUT}$ 104. In a similar fashion, the asymmetric switching capacitor regulators in FIGS. 4-7 can be changed to step-up regulators by swapping the input node and the output voltage node of the asymmetric switching capacitor regulators in FIGS. 4-7.

In some embodiments, the asymmetric switching capacitor regulator can be used for various applications including power management integrated circuits (PMICs), battery chargers, LED drivers, envelope tracking power amplifiers.

In some embodiments, the capacitance of switching capacitors can be set to be proportional to an output current of the asymmetric switching capacitor regulator. The capacitance of switching capacitors can be in the range of 0.1 nF/mA and 10 nF/mA, depending on the target power efficiency. The asymmetric switching capacitor regulator can improve its efficiency by using a larger number of capacitors.

Compared to buck regulators that require bulky discrete inductors in the range of 100 nH to 100 uH, asymmetric switching capacitor regulators can use significantly smaller inductors that are sometimes small enough to integrate on-die or on-package. In some embodiments, an asymmetric switching capacitor regulator can use an inductor having an inductance in the range of 1-100 nH. Such an inductor can be integrated on-chip or on-package. In some embodiments, an asymmetric switching capacitor regulator can use an inductor having an inductance in the range of 100 nH-10 uH. Such an inductor can be a discrete inductor that is provided on a printed circuit board (PCB). An inductor on the PCB can improve the power efficiency of the asymmetric switching capacitor regulator because the inductance is larger. However, it occupies a larger footprint than on-chip or on-package inductors with lower inductance values.

In some embodiments, an asymmetric switching capacitor regulator can be operated in a reverse direction to operate it as a step-up regulator. For example, an input node of the asymmetric switching capacitor regulator can be coupled to a target load, e.g., a chip, and an output node of the asymmetric switching capacitor regulator can be coupled to an input voltage source, e.g., a battery.

In some embodiments, an asymmetric switching capacitor regulator can be operated in a reverse direction to operate it as a battery charger. For example, an input node of the asymmetric switching capacitor regulator can be coupled to a power source, e.g., a power line of a Universal Serial Bus (USB), and an output node of the asymmetric switching capacitor regulator can be coupled to a battery.

In some embodiments, an asymmetric switching capacitor regulator can be operated in a reverse configuration (e.g., the input node and the output node of the asymmetric switching capacitor regulator are switched.) The operational direction of the asymmetric switching capacitor regulator can be flexibly modified to accommodate various types of input voltage sources and output loads coupled to the input node and the output node of the asymmetric switching capacitor regulator.

Various embodiments of the disclosed asymmetric switching capacitor regulator can be used as a battery charger in a battery-operated device. For example, an output node of an asymmetric switching capacitor regulator can be coupled to a battery so that the output voltage and the output current of the asymmetric switching capacitor regulator are used to charge the battery.

The asymmetric switching capacitor regulator can be particularly useful in charging batteries in a handheld device. A handheld device, such as a smartphone, can use a Lithium-Ion (Li-Ion) battery that is configured to provide a voltage output within the range of approximately 2.8-4.3V, depending on whether the battery is charged or not (e.g., 4.3V when fully charged, 2.8V when fully discharged). The Li Ion battery in the handheld device can be charged using a Universal Serial Bus (USB). The current version of the USB power line uses 5V (and the future versions of the USB may use even higher voltages), which is higher than the voltage output of the Li Ion battery. Therefore, the voltage from the USB power line should be stepped down before it can be used to charge the Li Ion battery. To this end, the asymmetric switching capacitor regulator can be configured to receive the power line voltage and current from the USB and provide a step-down version of the power line voltage and current to the Li-Ion battery so that the Li-Ion battery can be charged based on the voltage and current from the USB.

In some embodiments, the above-identified configuration, in which a battery is charged using a USB power line, can be used in reverse as a USB On-The-Go (OTG), where the battery in a first device can deliver power to a second device over USB to charge the second device. In this scenario, a battery in a first device is configured to deliver current to a battery in a second device through a USB. Although the output voltage of the battery in the first device may be lower than the USB power line voltage, the asymmetric switching capacitor regulator can operate in a step-up configuration to step-up the output voltage of the battery to that of the USB power line. This way, the battery in the first device can charge the battery in the second device over the USB power line.

Figure 10:
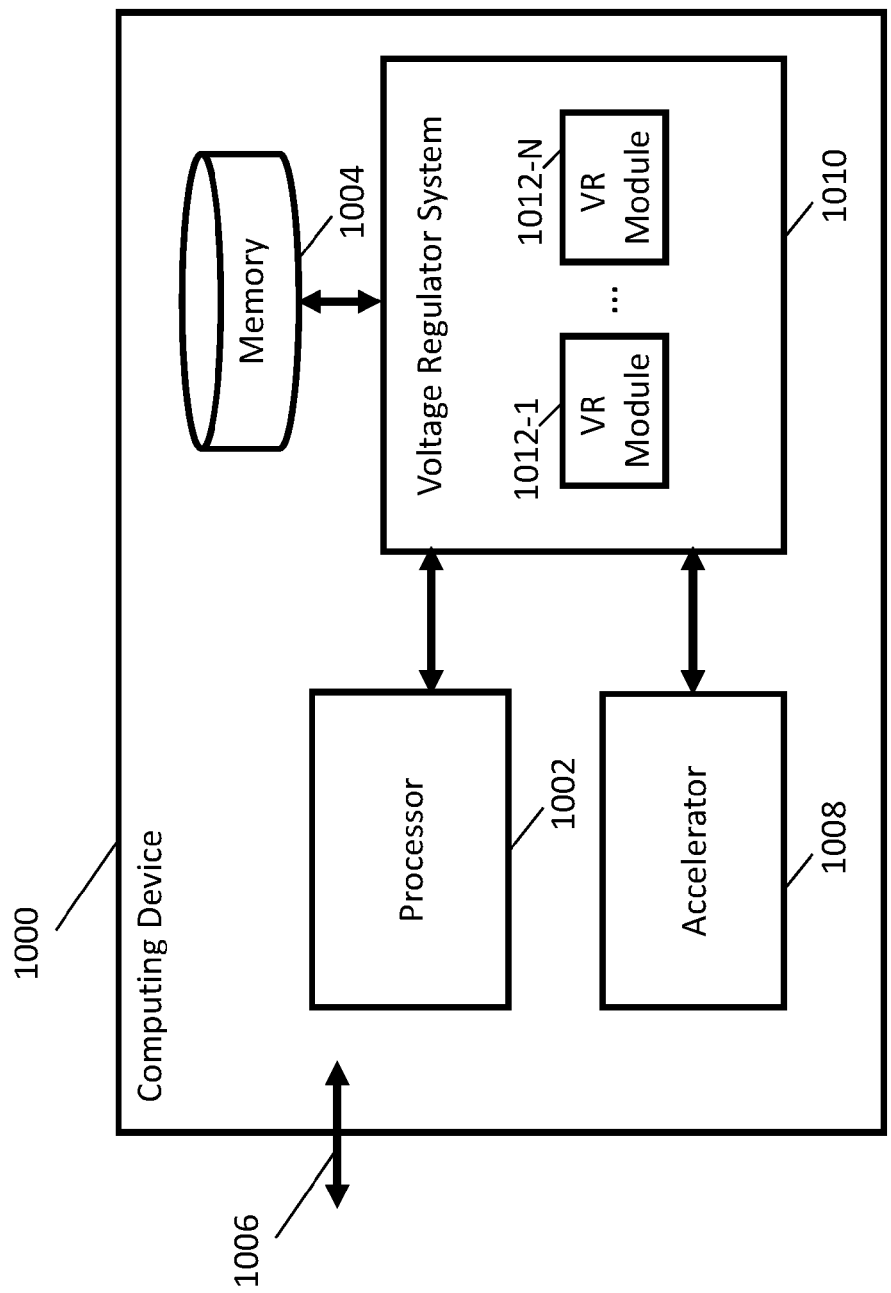
FIG. 10 is a block diagram of a computing device that includes an asymmetric switching capacitor regulator in accordance with some embodiments.

FIG. 10 is a block diagram of a computing device that includes an asymmetric switching capacitor regulator in accordance with some embodiments. The computing device 1000 includes a processor 1002, memory 1004, one or more interfaces 1006, an accelerator 1008, and a voltage regulator system 1010. The computing device 1000 may include additional modules, fewer modules, or any other suitable combination of modules that perform any suitable operation or combination of operations.

In some embodiments, the accelerator 1008 can be implemented in hardware using an application specific integrated circuit (ASIC). The accelerator 1008 can be a part of a system on chip (SOC). In other embodiments, the accelerator 1008 can be implemented in hardware using a logic circuit, a programmable logic array (PLA), a digital signal processor (DSP), a field programmable gate array (FPGA), or any other integrated circuit. In some cases, the accelerator 1008 can be packaged in the same package as other integrated circuits.

In some embodiments, the voltage regulator system 1010 can be configured to provide a supply voltage to one or more of the processor 1002, memory 1004, and/or an accelerator 1008. The voltage regulator system 1010 can include one or more voltage regulator (VR) modules 1012-1 . . . 1012-N. One or more of the VR modules 1012-1 . . . 1012-N can be an asymmetric switching capacitor regulator, for example, as disclosed in FIGS. 4-10. The one or more VR modules 1012-1 . . . 1012-N may operate in multiple interleaved phases.

The computing device 1000 can communicate with other computing devices (not shown) via the interface 1006. The interface 1006 can be implemented in hardware to send and receive signals in a variety of mediums, such as optical, copper, and wireless, and in a number of different protocols, some of which may be non-transient.

In some embodiments, the computing device 1000 can include user equipment. The user equipment can communicate with one or more radio access networks and with wired communication networks. The user equipment can be a cellular phone having telephonic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, Tizen and Android. The screen might be a touch screen that is used to input data to the mobile device, in which case the screen can be used instead of the full keyboard. The user equipment can also keep global positioning coordinates, profile information, or other location information. The user equipment can also be a wearable electronic device.

The computing device 1000 can also include any platforms capable of computations and communication. Non-limiting examples include televisions (TVs), video projectors, set-top boxes or set-top units, digital video recorders (DVR), computers, netbooks, laptops, and any other audio/visual equipment with computation capabilities. The computing device 1000 can be configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The computing device 1000 can also provide a variety of user interfaces such as a keyboard, a touch screen, a trackball, a touch pad, and/or a mouse. The computing device 1000 may also include speakers and a display device in some embodiments. The computing device 1000 can also include a bio-medical electronic device.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems and methods for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A voltage regulator, configured to receive an input voltage at an input node and to provide an output voltage at an output node, comprising:
   an inductor;
   a first capacitor configured to accommodate a first voltage;
   a second capacitor configured to accommodate a second voltage;
   a switch matrix that is configured to alternate between a first configuration and a second configuration, wherein, in the first configuration, the switch matrix is configured to couple the first capacitor and the second capacitor in a parallel relationship through the inductor, and wherein, in the second configuration, the switch matrix is configured to couple the first capacitor and the second capacitor in a series relationship between the input node and a ground node; and
   a plurality of power switches configured to induce a current through the inductor to provide a voltage differential between the first voltage and the second voltage in the first configuration, wherein the plurality of power switches comprises a first switch and a second switch, wherein, in the first configuration, the first switch and the second switched are configured to alternate between a first state and a second state with a predetermined duty cycle to provide the voltage differential between the first capacitor and the second capacitor.

2. The voltage regulator of claim 1, wherein, in the first configuration, the inductor and the first capacitor are in a series relationship, and the inductor and the first capacitor are collectively in a parallel relationship with the second capacitor.

3. The voltage regulator of claim 1, wherein the first capacitor is a switching capacitor and the second capacitor is a decoupling capacitor.

4. The voltage regulator of claim 1, wherein the first capacitor and the second capacitor are switching capacitors that are, in the first configuration, at a same layer of a stack of capacitors coupling the input node and the ground node.

5. The voltage regulator of claim 4, wherein, in the second configuration, the second capacitor is coupled to the output node and is in parallel with a decoupling capacitor.

6. The voltage regulator of claim 1, wherein, in the first state, the first switch is turned on and the second switch is turned off to couple the first capacitor and the second capacitor in parallel through the inductor, and in the second state, the first switch is turned off and the second switch is turned on to de-couple the first capacitor and the second capacitor.

7. The voltage regulator of claim 1, wherein the first switch is disposed between the output node and the inductor.

8. The voltage regulator of claim 1, wherein the first switch is disposed between the inductor and the first capacitor.

9. The voltage regulator of claim 1, wherein the output voltage of the voltage regulator is determined based on the predetermined duty cycle.

10. The voltage regulator of claim 1, further comprising a third capacitor, wherein in the second configuration, the switch matrix is configured to cause the third capacitor to be in a series relationship with the first capacitor.

11. The voltage regulator of claim 10, wherein, in the first configuration, the switch matrix is configured to couple the third capacitor to the output node in parallel with the second capacitor.

12. The voltage regulator of claim 10, wherein, in the first configuration, the switch matrix is configured to cause the third capacitor to be coupled to the first capacitor in parallel.

13. The voltage regulator of claim 1, wherein the inductor has an inductance in the range of 1-100 nH.

14. The voltage regulator of claim 13, wherein the inductor is on-chip or on-package.

15. The voltage regulator of claim 1, wherein the inductor has an inductance in the range of 100 nH-10 uH.

16. An electronic system comprising:
a voltage regulator according to claim 1, wherein the voltage regulator is configured to operate in a reverse direction in which the output node in the voltage regulator is coupled to an input voltage source and the input node of the voltage regulator is coupled to a target load.

17. The electronic system of claim 16, wherein the electronic system operating the voltage regulator in the reverse direction is configured to operate the voltage regulator as a step-up regulator.

18. An electronic system comprising:
a voltage regulator according to claim 1; and
a target load system coupled to the voltage regulator, wherein the output node of the voltage regulator is coupled to the target load system.

19. The electronic system of claim 18, wherein the electronic system comprises a mobile communication device.

* * * * *